Figure 20:
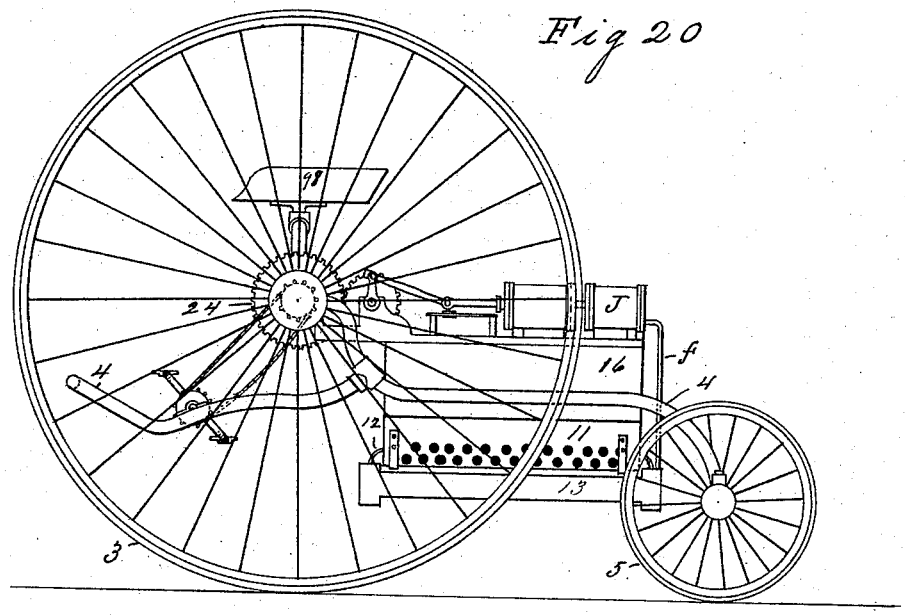

(No Model.)  
8 Sheets—Sheet 1.
J. H. BULLARD.
STEAM ROAD VEHICLE.
No. 365,788. Patented July 5, 1887.
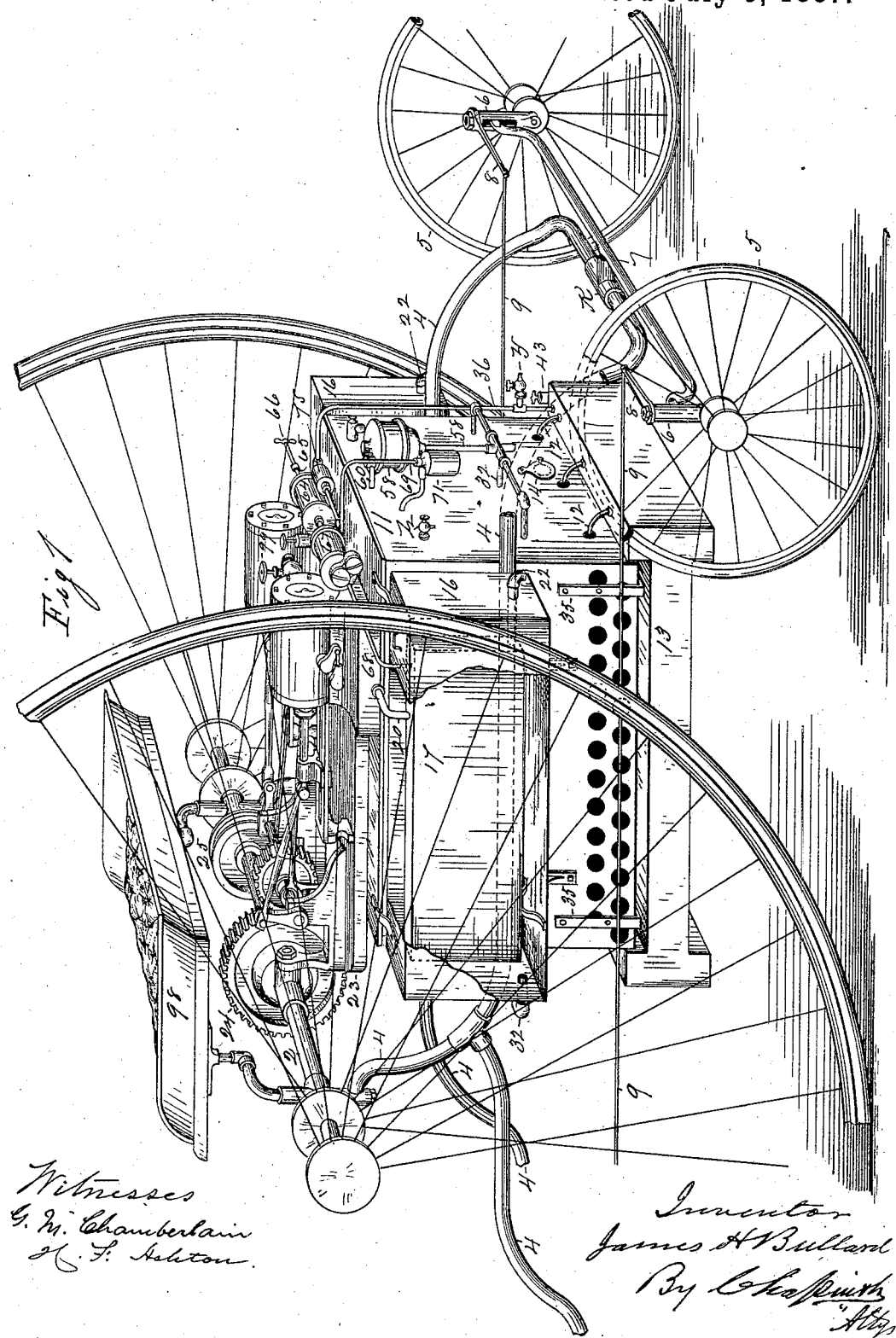

(No Model.) 8 Sheets—Sheet 2.
J. H. BULLARD.
STEAM ROAD VEHICLE.
No. 365,788. Patented July 5, 1887.
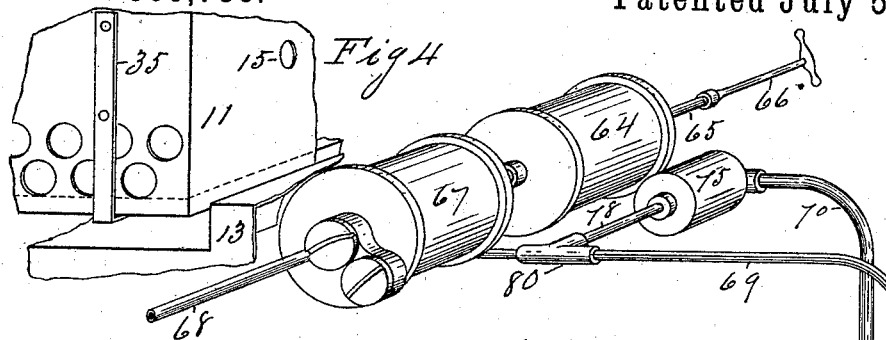
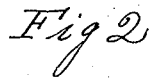
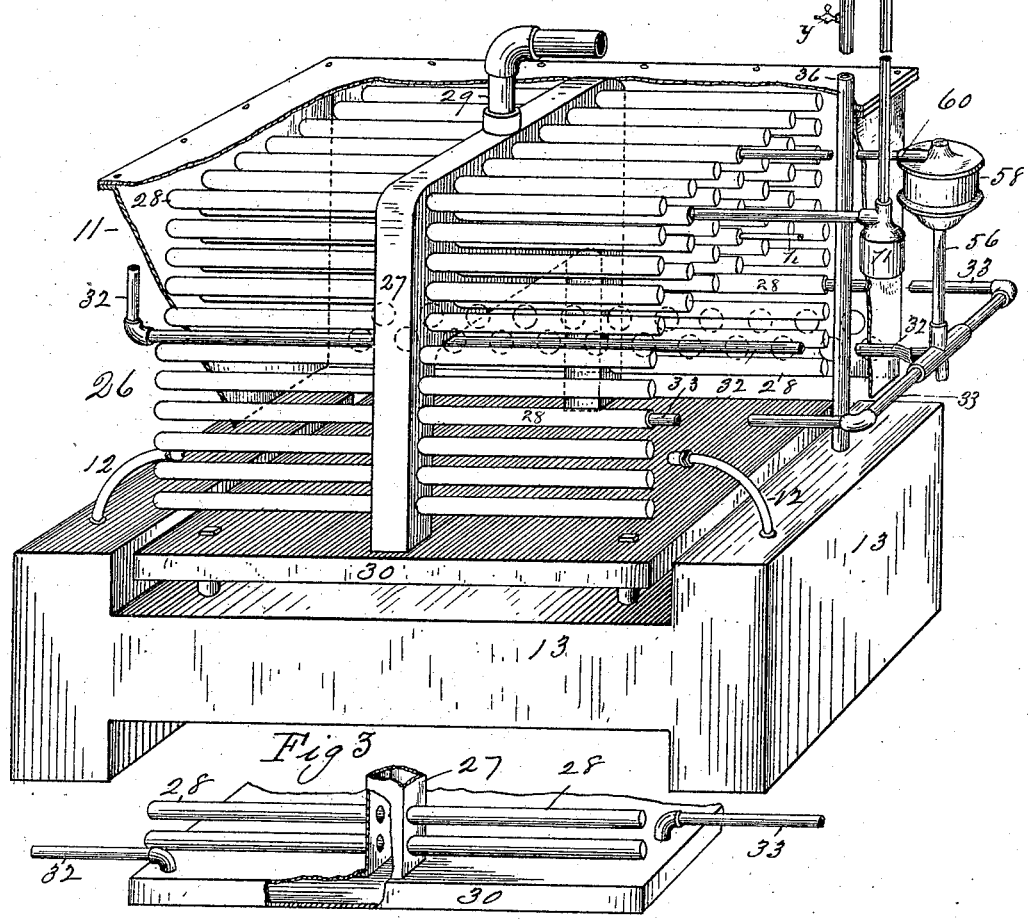
Witnesses.
G. M. Chamberlain.
H. F. Ashton.
Inventor
James H Bullard
By Chapin & Co.
Attys

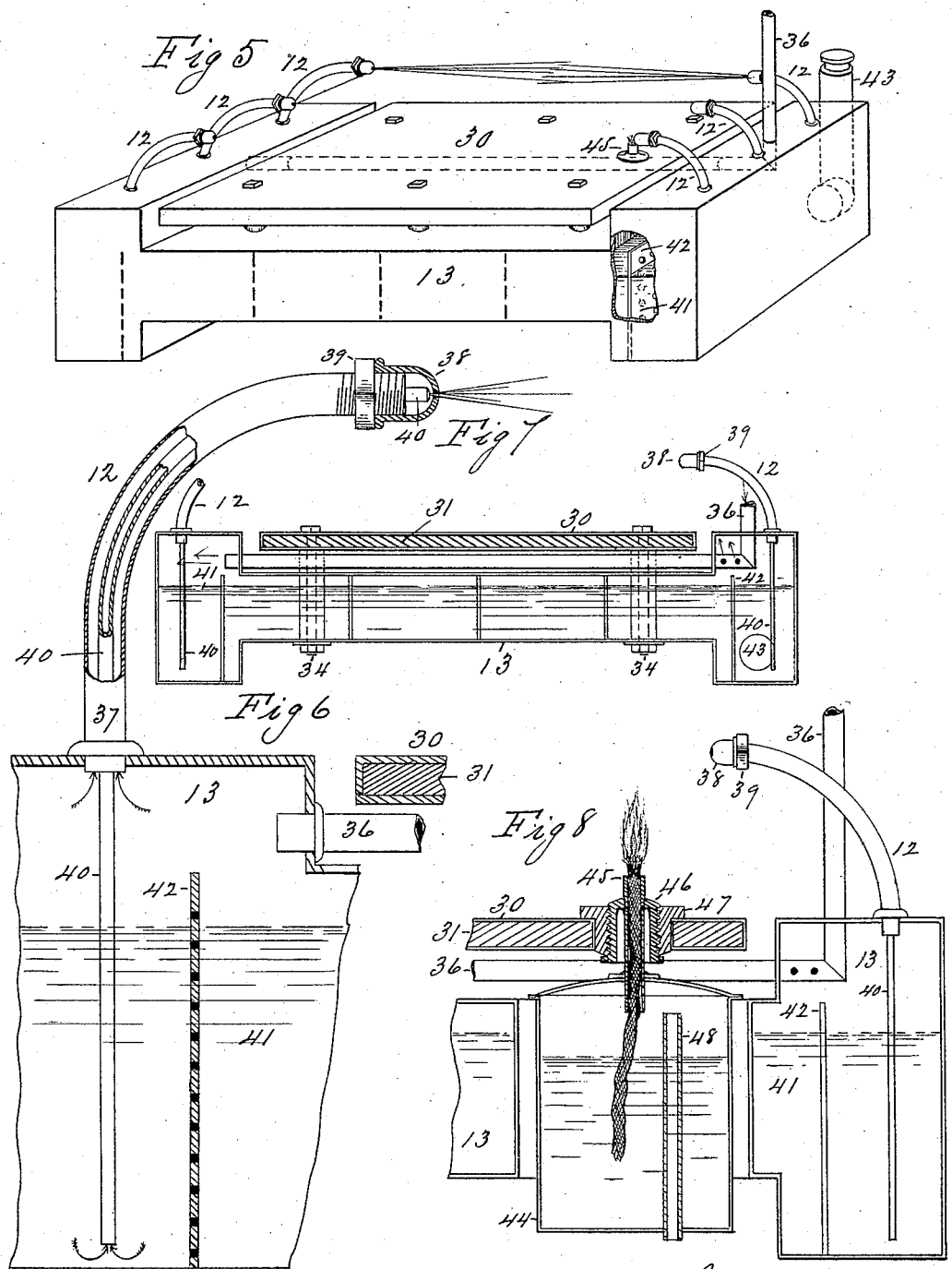

(No Model.)
8 Sheets—Sheet 4.
J. H. BULLARD.
STEAM ROAD VEHICLE.
No. 365,788. Patented July 5, 1887.
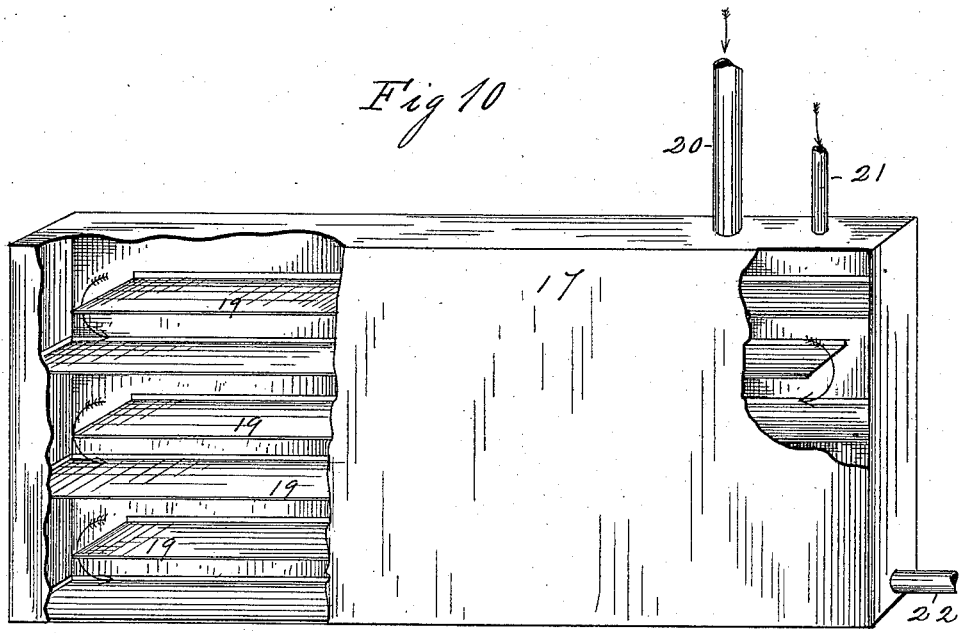
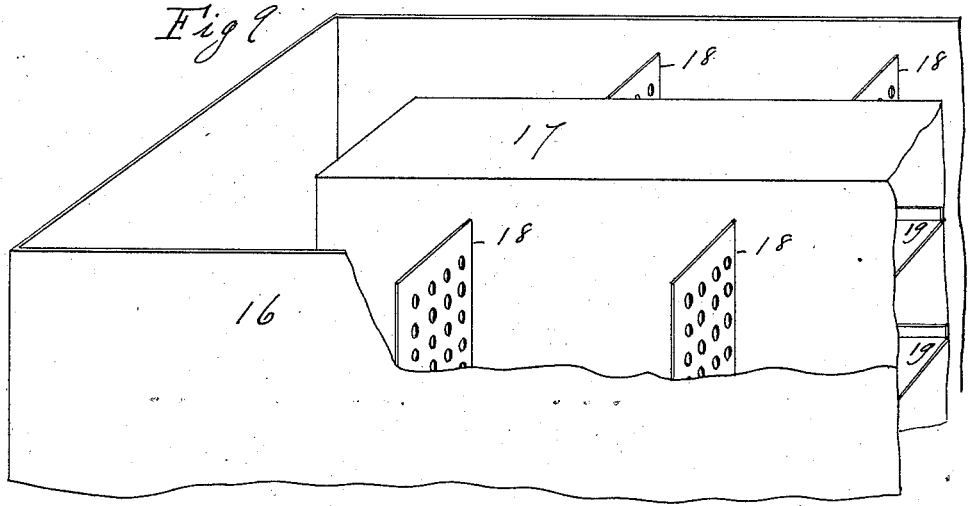

(No Model.)  
8 Sheets—Sheet 5.
J. H. BULLARD.
STEAM ROAD VEHICLE.
No. 365,788. Patented July 5, 1887.
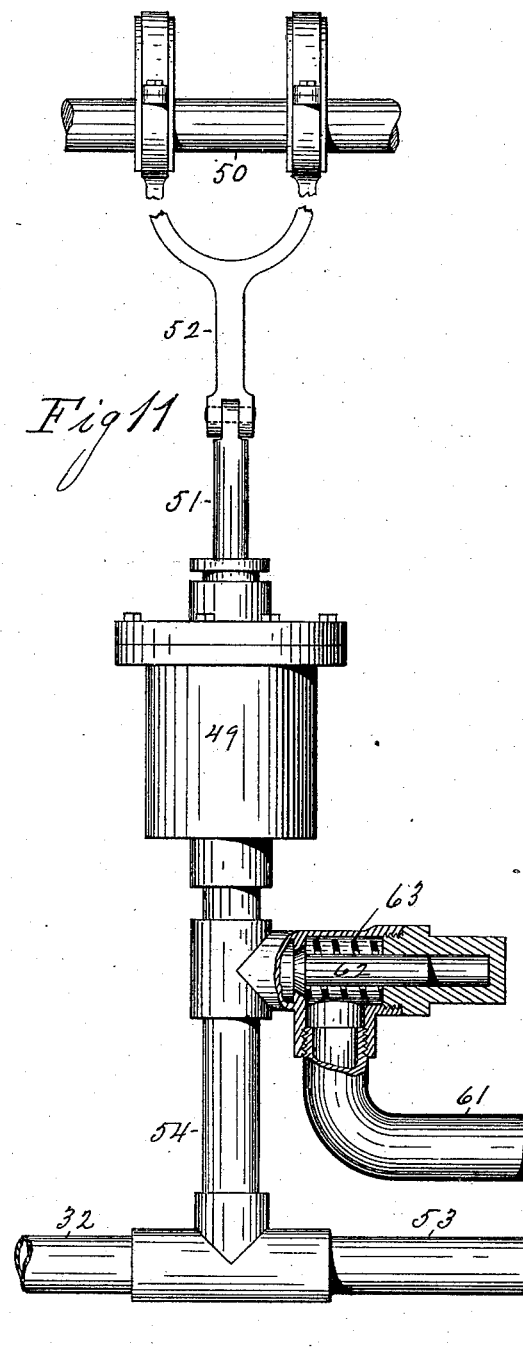

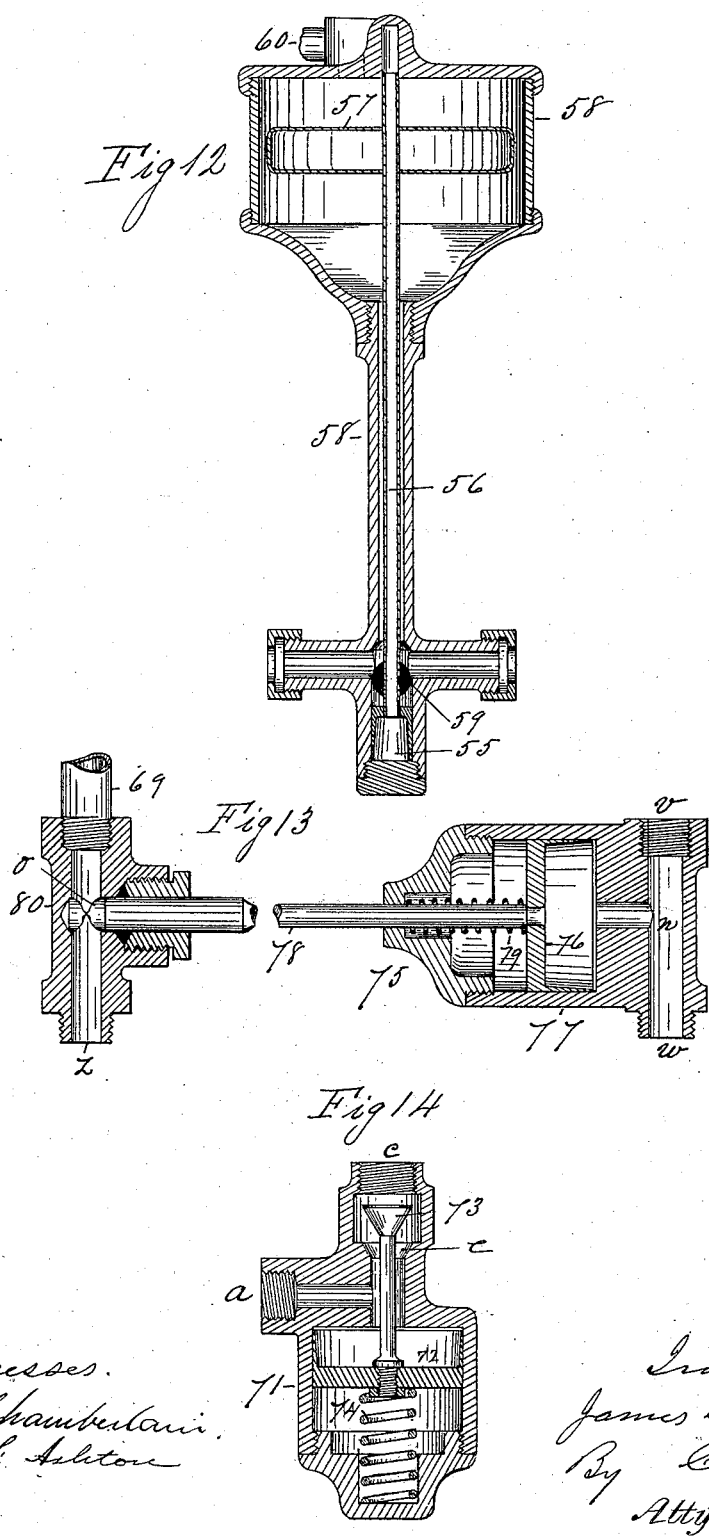

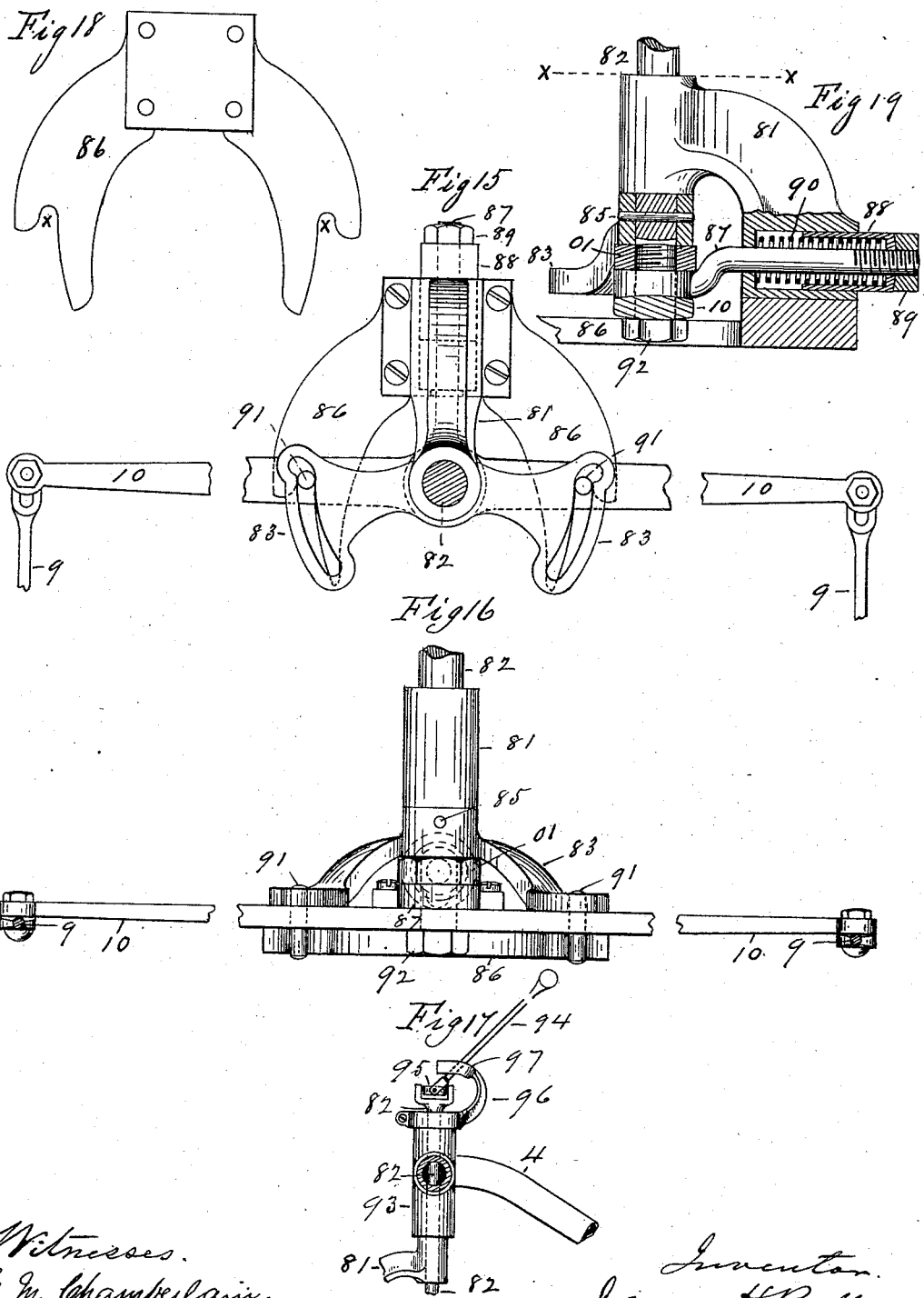

(No Model.)

J. H. BULLARD.
STEAM ROAD VEHICLE.

No. 365,788. Patented July 5, 1887.

8 Sheets—Sheet 8.

UNITED STATES PATENT OFFICE.

JAMES H. BULLARD, OF SPRINGFIELD, MASSACHUSETTS.

STEAM ROAD-VEHICLE.

SPECIFICATION forming part of Letters Patent No. 365,788, dated July 5, 1887.

Application filed September 20, 1886. Serial No. 213,971. (No model.)

*To all whom it may concern:*

Be it known that I, JAMES H. BULLARD, a citizen of the United States, residing at Springfield, in the county of Hampden and State of Massachusetts, have invented new and useful Improvements in Steam Road-Vehicles, of which the following is a specification.

This invention relates to improvements in steam-propelled road-vehicles of the tricycle class, the object being to provide improved motor and steam-generating mechanism and steering devices for such vehicles; and the invention consists in the peculiar construction and arrangement of the parts of the vehicle and its power-generating and propelling devices, all as hereinafter fully described, and set forth in the claims.

In the drawings forming part of this specification, Figure 1 is a perspective view of a steam-propelled road-vehicle constructed according to my invention, the forward end of the frame, upon which a portion of the steering-gear is located, being broken off, and a portion only of the wheels of the vehicle being shown. Fig. 2 is a perspective view of the steam-boiler of the vehicle and a portion of the fire-box inclosing the boiler, together with a steam air-pump and regulating devices connected with the boiler and a liquid-fuel tank, above which the latter is located. Fig. 3 is a perspective view of a portion of one leg of the boiler, several pipes connected therewith, a hollow bed-plate for the same, and portions of water-supply pipes connected therewith. Fig. 4 is a perspective view of one corner of the fire-box and of the fuel-tank, showing certain details of construction, hereinafter described. Fig. 5 is a perspective view of the liquid-fuel tank, the bed-plate of the boiler connected therewith, the fuel-ejectors attached to the tank, the latter showing, through a broken portion of the side thereof, certain details of construction, hereinafter described. Fig. 6 is an enlarged side elevation, partly in section, of a portion of the fuel-tank, of the boiler bed-plate and air-induction pipe, and of one of the fuel ejectors and atomizers. Fig. 7 is a side elevation, in section, of the fuel-tank and the boiler bed-plate. Fig. 8 is a side elevation, partly in section, of the fuel-tank and boiler bed-plate, illustrating the connection with the latter of a lamp for igniting the atomized liquid fuel. Fig. 9 is a perspective view of a portion of one of the water-tanks and the condenser. Fig. 10 is a perspective view of the condenser, portions of the exterior of which are broken away, said view showing portions of the pipes which conduct steam into the condenser and the water of condensation therefrom. Fig. 11 is a side elevation, partly in section, of the boiler-pump and a portion of its driving-shaft, showing a portion of the water-tank and the connections of the pump therewith, as below described. Fig. 12 is a view, in vertical section, of float and valve devices for governing the admission of water to the boiler. Fig. 13 is a side elevation, partly in section, of valve devices governing the admission of steam to the cylinder which actuates the air-pump. Fig. 14 is a side elevation, partly in section, of valve devices located between those shown in Fig. 13 and the boiler, and governing the flow of steam from the latter to the steam-cylinder of the air-pump. Fig. 15 is a plan view of the steering devices and portions of the connecting-rods connecting the steering-bar and the steering-wheels of the vehicle, showing the steering-post in section on the line $x\ x$, Fig. 19. Fig. 16 is a side elevation of Fig. 15, showing the upper end of the steering-post broken off and the ends of the said connecting-rods in section. Fig. 17 is a side elevation, partly in section, of the steering-post head, the steering-post and handle-bar, a portion of the tubular frame of the vehicle to which said head is connected, and of the post-support. Fig. 18 is a plan view of a plate secured under the steering-bar and hereinafter described. Fig. 19 is a side elevation, partly in section, of details of the construction of the steering devices, hereinafter described. Fig. 20 is a side elevation of the vehicle, showing a treadle-connection with the axle and a modified arrangement of the air-pump.

In the drawings, 2 indicates an axle on which are secured the wheels 3, which are the main supporting and driving wheels of the vehicle, said axle being hung in suitable bearings in the frame 4 of the machine, said frame being made preferably of metallic tubes, whereby is secured the greatest strength proportionate to the weight of the same. The rear wheels, 5, which are also the steering-wheels, support the rear end of the vehicle and are hung to rotate on bearing-studs which extend outward at right angles to the hollow posts 6. Said hollow posts are hung each of them on a vertical spindle on the end of the bar 7, which spindle has an upper and lower bearing in the upper and lower ends of said hollow post 6, said spindle-bearing being substantially the same as is embodied in that part of a bicycle which connects the end of the backbone with the driving-wheel fork thereof, and whereby said wheels 5 are permitted to be swung at an angle inclined to the axial line of said bar 7, to which they are connected, the latter being rigidly secured to the frame 4. An arm, 8, is secured to the upper end of each of said hollow posts 6, to each of which arms is pivotally connected a rod, 9, which extends to the forward part of the machine and is there connected to the end of the steering-bar 10. The said bar 7 has a swivel-connection with the T-piece K, whereby said bar is permitted to adjust itself to inequalities of the road surface.

A metallic fire-box, 11, is hung on suitable brackets between the side bars of the frame 4 at the rear of the axle 2, as shown in Fig. 1, said brackets having a suitable engagement with said bars. The sides of said fire-box are perforated to admit air for the purposes of combustion, as shown in Figs. 1, 2, and 4, and at the end thereof are suitable openings through which project the ends of the liquid-fuel injectors and atomizers 12, the latter being arranged in opposite ends of the liquid-fuel tank 13, as shown in Figs. 2 and 5, and they enter both the front and the rear ends of said fire-box through suitable openings in the latter. A pivoted door, 14, is hung on the rear end of the fire-box and covers a peek-hole in the end of the latter. (Shown in Fig. 4 and numbered 15.) A water-tank, 16, is secured on each side of the fire-box 11, to carry a supply of water for the steam-generating boiler of the vehicle, and within each of said tanks is located a condenser, 17, which condensers receive the exhaust-steam from the engine and other operating parts of the machinery, as below described. The details of the construction of the said water tank and condenser are shown in Figs. 9 and 10, Fig. 9 showing a portion of the condenser located within a part of the water-tank, the space between the side walls of the latter and the side walls of the condenser having placed therein several vertical perforated diaphragms, 18, which, while allowing a free circulation of water within the tank, prevent any quick movement thereof in the direction of the length of the latter occasioned by the movement of the vehicle suddenly backward or forward, whereby the water in the tank would be spilled were there no obstacle to its movement, as aforesaid; and, furthermore, said perforated diaphragms, by preventing the said movement of the water in the tank, serve to keep the water in such a state of comparative quiescence that the sides of the condenser are kept more continuously covered than they otherwise would be, thereby securing a more thorough condensation of the exhaust-steam. The said condenser 17 is made of the form shown in Fig. 10, and its interior is divided into a series of chambers by several horizontal partitions secured therein, which partitions are designated by the number 19, and they extend, as shown in said figure, alternately from one end of the condenser nearly to the opposite end, thereby forming a continuous steam-passage of several times the length of the condenser, as there shown. The pipe 20 is the exhaust-pipe leading from the engine, and the pipe 21 is the exhaust-pipe leading from the steam-cylinder of the air-pump, and the pipe 22 conducts the water of condensation from the condenser through the adjoining end of the water-tank, letting it run onto the ground, portions of said three pipes being shown in Fig. 10.

The steam-engine which drives the vehicle is of the ordinary double-cylinder type, as shown in Fig. 1, and the bed-plate thereof, to which the cylinders and the operative parts of the engine are attached, is secured to the top of the fire-box 11, as shown, and to the front end of the bed-plate 23 are attached suitable standards, one of which is shown in Fig. 1, on which are supported additional bearings for the shaft 2, near the center of the latter, on which is a gear, 24, with which a gear on the crank-shaft of the engine engages. A friction-brake pulley, 25, adapted to receive a friction-strap of the well-known construction, is fixed on said shaft 2; but the brake devices to connect with said pulley are not illustrated in the drawings.

Figure 2 illustrates in perspective view the steam-generating boiler 26 and other co-operating devices directly connected therewith, hereinafter described. Said boiler consists of a hollow head, 27, of suitable metallic construction, into each side of which are secured a series of tubes, 28, by one end, their opposite ends being hermetically closed. Said head 27 is made in the form shown in Fig. 2, and said pipes are attached thereto in such manner as to form on the upper side of the boiler groups of pipes with but narrow spaces therebetween, and from the latter, extending downward on each side of the boiler, single groups of pipes, as shown, the latter in effect constituting the sides of that part of the boiler in which the heat-generating flame is introduced, a chamber being formed within the (so to speak) tube-walls of the boiler, in which the combustion of the atomized liquid fuel takes place, as below described, the peculiar construction of the boiler being particularly favorable to the admission among all its tubes of said flame, whereby steam is generated therein almost instantaneously and with the expenditure of but little fuel. The said boiler is suitably secured within the fire-box 11 by connections with the bed-plate 23 of the engine, and steam-connection between the boiler and the engine is made by means of the pipe 29.

The bed-plate 30 of the boiler may consist of a metallic shell, as shown in Figs. 6, 7, and 8, having an interior filling of asbestus, 31, or said bed-plate may be made in the form of a hollow metallic shell, as shown in Fig. 3, communicating with the hollow head 27 of the boiler, and when made hollow, as just described, the feed-water pipes 32 and 33 are connected therewith, as shown in Fig. 3, thereby aiding in raising the temperature of the feed water in its passage to the boiler.

In order to cause the atomized liquid fuel to be forced directly from the tank containing it into the said chamber within the tube-walls of the boiler, above referred to, the liquid-fuel tank is located directly under the boiler, as shown in Figs. 1 and 2; and in order to protect the contents of said tank from the heat of the flame within the furnace the bed-plate 30 is interposed between the boiler and said tank, and when made as above described, by filling a metallic shell with asbestus or other non-conducting substance—as lamp-black, for instance—and supported somewhat separated from the top of the tank 13, as shown in the drawings, whereby an air-space is formed between the bed and the tank, it is found in practice that the contents of the latter remain quite cool when heat is applied to the boiler, and practically the same result is obtained when cold feed-water is passed through a hollow bed-plate, such as is shown in Fig. 3. The bed-plate 30 lies on the upper ends of a series of metallic tubes, which pass up through the tank 13 and project above its upper side, as shown, and bolts 34 pass through the bed-plate and through said tubes, as shown by dotted lines in Fig. 7, and are secured therein by nuts under the tank, as there shown.

As further means for suitably securing the boiler within the furnace 11, and for attaching the tank and the bed-plate securely to the under side of the furnace and boiler, several iron straps, 35, are bolted to the sides of the furnace, as shown in Figs. 1 and 4, and have their lower ends bent inward and extending under the bed-plate, thereby forming a hook-engagement with the latter.

The fuel tank 13 is made in the form shown— that is to say, with its central portion between its ends thinnest—in order to provide additional air-space at each end of the tank when nearly filled with liquid fuel, as shown in Fig. 8, the air-pipe 36, which conveys the air from the air-pump, below described, entering the end of the tank, as shown in Figs. 7 and 8, and extending thence in a horizontal direction through one wall of the tank, between the upper side of the latter and the bed 30, and passing through a wall of the opposite end of the tank, the said pipe being perforated, as shown in said figures, to distribute the air in the end of the tank at which it enters, as well as through its open end in the opposite end of the tank.

The liquid-fuel injectors and atomizers 12 consist each of an outer bent tube, 37, (see Fig. 6,) having on the outer end thereof a cap, 38, provided with a small central perforation, which screws onto the end of said tube 37, a lock-nut, 39, being placed on said tube behind said cap to lock the latter in any desired position on the tube. The tube 37 is secured in the top of the tank 13, preferably by screwing, but it may be secured thereto in any suitable manner. A tube, 40, of less external diameter than the interior of tube 37, is placed within the latter and extends from near the bottom of the tank 13 through tube 37, and projects beyond the outer end thereof, as shown. By means of said construction of the ejector and atomizer an air-passage is formed between the tubes 37 and 40, which extends from and communicates with the air-space in the tank 13 above the fuel 41 therein, and terminates at the outer end of the tube 37 within the cap 38, through which air from the tank is forced, as below described, and the same force which drives the air out of the tank forces the liquid fuel into and through the tube 40, as indicated by arrows in Fig. 6, causing the same to be delivered in a small jet just within the end of the cap 38 and through said perforation therein, thereby forming an atomized spray of mingled air and liquid fuel, as indicated in Figs. 5 and 6. To the end that such a quantity of air as the best conditions for attaining a proper combustion of the atomized fuel may demand may be mixed with the jet of fuel which escapes from the end of the tube 40 when it passes through the perforation in the cap 38, the latter is made adjustable toward and from the end of the tube 40 by screwing it on the end of the tube 37, thereby restricting or enlarging the air-passage between the end of tube 40 and the inner side of that part of the cap which surrounds the perforation therein through which the fuel is injected. Said lock-nut 39 serves to lock the cap 38 after the latter has been adjusted. By this means just the quantity of air is admitted to and mingled with the atomized liquid fuel which may be required to produce such perfect combustion as entirely obviates the production of smoke in the furnace.

The fuel-tank 13 is, like the above-described water-tank 16, provided with a series of perforated diaphragms, 42, which serve, like those in said tank, to prevent any inconvenient movement of the body of liquid fuel 41 from one end of the tank to the other, which might otherwise be caused by the motion of the vehicle. The tank 13 is supplied with said fuel through a suitable capped tube, 43.

To provide for the most economical use of liquid fuel in maintaining any required degree of mean steam-pressure in the boiler, the supply of atomized fuel and air to the furnace is automatically governed and regulated, as hereinafter described; and by reason of such provision the supply of fuel to the furnace is caused to be either regular or intermittent, according to the amount of steam which the motive power may demand. Hence it will be seen that at one moment the furnace is filled with flame and at the next the latter is totally extinguished, and these conditions of operation require that the furnace be provided with means for setting fire to the atomized fuel when, after its supply to the furnace has ceased, its injection is resumed. To that end a lamp, 44, having its wick-tube and wick 45 passing through the bed 30, is secured under the latter, as shown in Fig. 8. Said lamp is located in an opening through the tank 13, hanging downward below the latter, its wick-tube being attached to a hollow nut which is screwed into a bushing, 47, in the bed-plate, thereby avoiding the communication of heat to the contents of the lamp when any volatile substance is used therein for maintaining a light.

To further provide against any danger from the accumulation of inflammable gas in the lamp 44, a tube, 48, is placed therein, extending from above the contents thereof down through the bottom of the lamp, through which such gas, should any be generated in the lamp, may pass freely off. The lamp is easily attached to and detached from the bed 30 by reaching under the latter and screwing or unscrewing the same.

Any desired number of the injector and atomizing tubes 12 may be attached to one or to each end of the tank 13, three being shown at each end thereof in the drawings, and as there shown in Fig. 1 the holes in the wall of the furnace through which said atomizer-tubes pass are of considerably greater diameter than the said tubes, and said holes are so made to provide for the forced introduction or draft of a certain amount of air through the holes around the said tubes, caused by the aforesaid jet of air and atomized fuel which is forced through the cap 38.

The above-described provision for the introduction of air to the furnace around the atomizer-tubes is found in practice to obviate the necessity of maintaining so high an air-pressure in the tank 13, and thereby less steam is used for driving the air pump. The ejecting ends of the atomizer-tubes may terminate outside of the furnace walls, opposite the openings therein, without prejudice to the supply of fuel or its perfect combustion.

The boiler-feed pump 49, Fig. 11, is located under and actuated by the crank-shaft of the engine, connection with the piston-rod 51 of the pump being made by means of the connecting-rod 52, the usual eccentric-and-strap connection being made between said shaft and the latter-named rod, as shown. The pump 49 is connected with a pipe, 53, by the vertical pipe 54, by a T-connection, as shown, said pipe 53 connecting with the water-tank 16 (a part of which is shown in Fig. 11) and the pipe 32, (see Fig 2,) extending from the point shown in Fig. 11 through the furnace between the said inner tubular walls of the boiler and through the end of the furnace, as shown in Fig. 1, these entering a T-connection with a side branch thereon, and from the ends of said connection pipes 33 extend to and are connected with the ends of two of the boiler-tubes 28, as shown in Fig. 2. The water pumped into the boiler is more or less warmed by the condenser in the tank, and is still further heated by the passage of the pipe 32 through the furnace.

The above-described pump-connection provides for supplying the boiler with water from the tank 16 by a constant action of the pump while the vehicle is running, and to prevent the boiler from being oversupplied with water, and to provide for conveying the water drawn through pipe 53 from the tank 16 back to the same when the water in the boiler reaches its proper height, the below-described devices are applied between the pump and the tank and the boiler. A valve, 55, connected by a suitable stem, 56, with a float, 57, (see Fig. 12,) is arranged in the aforesaid T-connection outside the end of the furnace, (see Fig. 1,) where the feed pipes branch off from pipe 32. Said valve, valve-stem, and float are contained in said T-connection and in a hollow case, 58, the circular opening 59 in said connection in Fig. 12 indicating the opening at the end of the feed-pipe 32, connected therewith, which projects beyond the end of the furnace back of the said T-connection in Fig. 1. The central portion of said T-connection is fitted to receive the valve 55 when it is lifted up, and said valve then entirely covers the said opening 59, thereby preventing the passage of any water therethrough to the boiler; but to prevent the obstruction of communication between the lower end of the case-stem 56 and the boiler through the pipes 33 said opening 59 is formed below or to one side of the center line of the passages through the lateral branches of said T-connection, and thereby provision is made whereby the valve 55 may rise and close said opening 59 without shutting off entirely the passages through said lateral branches.

A pipe, 60, connects the hollow case 58 with one of the higher of the boiler-tubes, whereby the steam-pressure of the boiler is communicated to said case, and by the connection of the lower end of said case with the feed-water pipe, as aforesaid, water is admitted to said case and rises therein to such height as it may be in the boiler, and consequently when the float 57 and valve 55 are raised from the positions shown in Fig. 12 the opening 59 is closed, and no water can flow from the pump. Under the last-named conditions it is obvious that provision must be made for disposing temporarily of the water which the pump takes from the tank 16, so that the action of the pump may not be interfered with, and to meet the said requirement the pass-pipe 61, having the valve 62 therein, on whose stem is a spring, 63, holding said valve to its seat, is interposed between the pipe 54 and the water-tank 16. The power of said spring 63 is such as to hold the valve 62 shut against the maximum steam-pressure of the boiler, but permitting the valve 62 to open when the pipe 32 is closed by the valve 55, thereby letting the water from the pump pass back into the water-tank. Thus it is seen that the valve 55 is caused to rise and fall according to the height of the water in the boiler, thereby governing automatically the admission of water thereto only when required.

The aforesaid regular or intermittent supply of atomized liquid fuel to the furnace for the purpose of generating steam in the boiler is provided for by the below-described automatically - operating devices, which consist of a steam-actuated air-pump, a valve located in the steam-pipe between the steam-cylinder of the air-pump and the boiler, which allows steam to pass to said cylinder while the pressure in the boiler remains below a certain point, an air-pipe connecting the air-pump with the liquid-fuel tank, and a piston-valve connected between said steam-pipe and air-pipe, operated by the air-pressure of the fuel-tank to shut off the steam from the steam-cylinder of the air-pump and stop the latter when a certain degree of air-pressure is attained in the fuel-tank. The said air-pump 64 is of the ordinary construction, having the end of its piston-rod 65 projecting through one head of its cylinder, and being adapted to have applied thereto the handle 66, for a purpose below described. The air-pump is operated by the piston of the steam-cylinder 67, the piston-rod of the latter and that of the air-pump being the same. The pipe 68, projecting from one head of the cylinder 67, is the exhaust-pipe of the latter, and the pipe 69, attached to the opposite end of the cylinder 67, is the steam-supply therefor, connecting it with the boiler. The pipe 70 connects the air-pump 64 with the fuel-tank 13. A valve-case, 71, (see Fig. 14,) is connected in the said steam-pipe 69, the inlet to which is at $a$, and whose outlet is at $c$. Said valve-case is provided with a piston, 72, having a valve and spindle, 73, attached thereto, which valve has a seat at $e$ in said case, and a spring, 74, under said piston, capable of resisting the desired working steam-pressure of the boiler, holds the valve 73 off from its seat $e$, thereby permitting steam to freely pass to the cylinder 67 until said steam-pressure exceeds said working-point, and when it does the piston 71 is thereby moved against spring 74, causing said valve to be shut, thereby cutting off the supply of steam to said cylinder and stopping the air-pump, and consequently the supply of air-pressure to the fuel-tank 13, the result of which is that the ejection of fuel therefrom ceases and the fire in the furnace is extinguished. As soon as the steam-pressure in the boiler becomes reduced below its said working-pressure, the said spring 74 lifts the valve 73 off from its seat again, letting steam pass to the cylinder 67, thereby causing the air-pump to resume its action, the result of which is that the furnace is again supplied with atomized fuel, which is lighted by the flame of the lamp 44, as above described, and the steam-pressure in the boiler is again increased to its required degree.

To provide for an economical use of the liquid fuel, or, in other words, to prevent the injection of more of the latter into the furnace than can be consumed under the best conditions, a comparatively low degree of air-pressure is maintained in the fuel-tank 13, and care is taken that said air-pressure shall be as regular as is practicable. To that end the aforesaid piston-valve 75 is connected between the steam-pipe 69 and the air-pipe 70, as shown in Figs. 1 and 2, the details of the construction thereof being shown in Fig. 13, wherein 76 is the piston of the valve, 77 the piston-cylinder, 78 the piston-rod having a valve-shaped end, $o$, and 79 is a spring on the piston-rod between the piston and one end of the case 77 or cylinder. In said Fig. 13, 80 indicates a T-shaped connection in the aforesaid pipe 69, which receives through a suitable stuffing - box the valve-shaped end of said piston-rod 78, which end is adapted to be moved by excessive air-pressure against the piston 76 in a direction across the steam-passage $z$ in said T-connection 80 and restrict the said passage. The air-pipe 70, leading from the air-pump 64 to the fuel-tank 13, is connected with the valve-case 77 at each end of the passage $n$ through the latter, a branch passage from said passage $n$ connecting the latter passage with the internal chamber in the case 77, in which is located the piston 76. When said air-pump commences to operate, the air-pressure on the air-pipe 70 and the fuel-tank 13 gradually increases, and to prevent such action of the air-pump as will create too much pressure in said tank the resistance of the spring 79 is so regulated that any excess of air-pressure above that required acts against the piston 76, giving motion to the latter and to the rod 78 against the force of the spring 79, thereby causing the end of the rod 78 to be forced partly across the passage $z$, through which steam passes to actuate the pump, or to such a degree as to reduce and regulate the movement of the latter, thus keeping the air-pressure in the fuel-tank at the desired point. When the action of the pump 64 ceases, spring 79 operates to withdraw the end of the rod 78, leaving the passage $z$ quite open.

The above-referred-to steering devices, which are connected with the rear wheels, 5, of the vehicle by the rods 9, are adapted to turn each of said wheels at different degrees of incline to the bar 7, at the ends of which they are supported, in order that each of said wheels may rotate in tracks which particularly describe two circumferential lines of a circle in which the vehicle turns, thereby preventing any lateral drag on the tires of the steering-wheels. The bar 10, to the ends of which said rods 9 are connected, is provided with two stop-pins, 91. The bar 10 is hung and adapted to be vibrated in a horizontal plane on a central fulcrum-bolt, 92, and the latter is connected to the end of an eyebolt, 87, which passes through a socket in the lower end of a steering-post support, 81, in which socket is placed a spiral spring, 90. A tubular case, 88, inclosing one end of said spring, fits loosely in the open end of said socket, and a nut, 89, on the outer end of the eyebolt 87 holds said case 88 over the spring 90, and serves to so compress the latter as to draw the eyebolt into said socket, thereby, by the action of said spring, drawing the bar 10 to a normally right-angled position relative to the eyebolt 87, which position it rests in when not operated upon to swing the wheels 5, and thereby the latter are held in such position as is required to guide the vehicle in a right line. Said bolt 92 is secured by a nut, O'. A plate, 86, bolted under the support 81, has two arms extending under the bar 10, (see Figs. 15 and 16,) in each of which is a socket, x, in one of which one of the said pins 91 in the bar 10 engages when the latter is swung to operate the wheels 5. A yoke, 83, having a central socket thereon to receive the lower end of the steering-post 82, which is attached to said socket by a pin, 85, (see Fig. 19,) is supported thereby over the bar 10, as shown. Said steering-post, as hereinafter described, is turned by a suitable handle to operate the steering devices, and thereby said yoke is given a vibratory motion in the plane of the bar 10. Said yoke has formed in each end thereof a curved slot, as shown, which is concentric with the center of the post 82, through which slots the upper ends of said pins 91 in the bar 10 extend. The said steering-post extends from its said point of connection with the yoke 83 through the end of the support 81 and through a tubular support, 93, (see Fig. 17,) the latter being secured to a transverse bar similar to the bar 7, between the front ends of the side bars of the frame 4, which are shown broken off in Fig. 1. To the upper end of the steering-post is attached a handle-bar, 94, by a common universal joint, 95. A handle-bar support, 96, having a bifurcated end, 97, is attached to the upper end of the said steering-post support 93, in which the handle-bar lies, extending in the direction of the rider, who sits on the seat 98, from which position he can conveniently reach the handle-bar and turn and operate the throttle-valve 99 of the engine.

The operation of the steering devices is as follows: The turning of the post 82 by the handle-bar 94 in either direction causes the yoke 83 to swing correspondingly, thereby effecting the engagement of the rear end of one of the curved slots in said yoke with one of the pins 91 in the bar 10. The continued swinging of yoke 83 causes the second pin 91 to back into or engage with one of the recesses x in the plate 86, and then the eyebolt 87 is drawn out against the force of the spring 90 to accommodate the changed position of the center of the bar to which said eyebolt is attached, for the said pin which is in engagement with the recess in the plate 86 now becomes the real fulcrum on which the bar 10 swings, and the latter is in effect a lever, having a long and a short arm, each of which arms operates to swing the wheel 5, to which it is connected, to a varying degree proportionate to the difference in the length of said arms. Thus the wheels 5 are each so turned as to follow in the lines of the circles, as above described. When the handle-bar 94 is released, the spring 90 draws back the eyebolt 87, and thereby swings the bar 10 again to its normal position, or to that shown in Fig. 15.

It is obvious that a boiler of different construction from that herein shown may be employed to generate steam for propelling the vehicle; but for several reasons, as below set forth, that shown in Fig. 2, or one substantially like it, is best adapted to the requirements of said vehicle. First, it is indispensable that the boiler be as light as practicable; secondly, that it be capable of generating a working pressure of steam from cold water in a few moments after lighting the fire, (the time actually required by the boiler herein shown being not more than two and one-half minutes,) and, thirdly, that the boiler be practically non-explosive, with a view to absolute safety in this regard, in order to adapt the vehicle to general use in the streets of towns and cities.

Other peculiar features of the construction herein shown and described, whereby the ordinary objections to the use of a steam-propelled vehicle on common roads are obviated, consist in those below set forth. First, the liquid-fuel tank and the devices connected therewith for forcing, by air-pressure, said fuel therefrom and atomizing it in the furnace are adapted to the employment of refined petroleum, (the latter being preferable,) naphtha, or alcohol, and the described construction and arrangement of the said air-forcing devices, the atomizers having means for regulating the admission of atmospheric air with the jet of fuel, and the described arrangement for the introduction of air to the furnace through openings surrounding the atomizer-pipes all contribute to such a perfect combustion of either of said hydrocarbons that no smoke whatever results therefrom, and no pipe is required for the furnace, either to carry off smoke or to aid combustion; secondly, by means of the water tank or tanks having therein a condenser to receive the exhaust-steam from the motor mechanism, as described, all noise from such exhaust and appearance of steam when the vehicle is running are entirely obviated. Said features of construction relating to means for obtaining a perfect combustion of fuel without smoke, and for preventing any issue of steam from the vehicle, obviate the objections heretofore made against steam-propelled vehicles for common roads constructed to emit their smoke and exhaust-steam in the usual manner, whereby horses are frightened.

Another improved feature of the herein described construction consists in providing a liquid-fuel boiler and furnace for steam road-vehicles with injector and atomizing devices through which the liquid fuel is forced by a regulated low air-pressure, instead of by steam-injection, thereby preventing the noise caused by the latter and obtaining a more regular and economical supply of fuel to the furnace, for in practice the said air-pressure required for properly conveying the fuel into the furnace and atomizing it is only about one and one-half pound to the square inch, said pressure being so regulated in order that no more fuel be injected into the furnace than can be advantageously consumed.

A further novel feature which is embodied in the construction and operation of the aforesaid steam-generating devices, and one which is nearly if not quite indispensable in a vehicle of the class herein described, consists in the means by which a given degree of steam-pressure up to any desired working-point is maintained automatically in the boiler for several hours while the engine is not running, as hereinafter described.

It is obvious that a steam road-vehicle should be so constructed that the rider may leave it for a longer or shorter time when riding for business or other visits, and when returning to it find the required pressure of steam in the boiler for again starting the engine and running the vehicle at its usual speed.

The general operation of the vehicle and its motor mechanism is as follows: Ordinarily sufficient water is left in the boiler after using the same for getting up steam; but should the boiler require water before lighting the fire, the front end of the vehicle may be blocked up, lifting the large wheels 3 from the ground. The latter are then free to be rotated by hand. By rotating said wheels a few times, whereby the said crank-shaft to which the feed-pump is connected is made to rotate, the pump is operated, thereby supplying the requisite water to the boiler. The lamp 44 is lighted and the air-pump is then operated a few strokes by the handle 66 on the end of the piston-rod 65 of said pump, thereby providing such air-pressure in the fuel-tank 13 as causes the fuel to be ejected into the furnace and there atomized, as described, where it is at once ignited by the flame of said lamp, the consequence of which is that in a few moments a working steam-pressure is generated in the boiler, setting the steam air-pump in motion and maintaining the requisite air-pressure in the fuel-tank. As soon, however, as the steam-pressure at all exceeds its fixed working limit—say seventy-five pounds to the square inch, more or less—the said valve 73 in the case 71 is made to shut by said excessive pressure, thereby stopping the air-pump by shutting off the steam-supply thereof, thereby causing the fire in the furnace to be extinguished by reason of the cessation of air-pressure in the fuel-tank. In a moment or two, however, owing to the absence of said furnace fire, the steam-pressure will decrease, letting said valve 73 open again, and the air-pump will be again set in motion, causing the fire in the furnace to be again started and the steam-pressure to be restored to its working-point. In this manner the furnace-fire is caused to be lighted and extinguished by a slight variation (say five pounds) of the steam-pressure from the fixed working-pressure. The above-described operation constitutes the aforesaid intermittent action of the furnace-fire, whereby it is maintained only when actually required for steam-generating purposes, thus effecting an important saving in fuel.

As above set forth, the air-valve in the case 64 serves also to regulate the speed of the air-pump according to the air pressure in the fuel-tank, preventing said pressure from rising above a certain point, and thereby causing an oversupply of fuel to be injected into the furnace. When the engine is running, the action of the air-pump is more continuous, owing to the more regular consumption of steam; but when the vehicle is standing and the engine is stopped, said intermittent action of the fire-governing devices is frequent, and thereby a working-pressure is kept up in the boiler while the vehicle is not running, as above referred to, and as long as water remains in the boiler. A gage-cock, $h$, is placed in one of the boiler-tubes at the water-line, for the usual purpose, and a cock, $y$, is placed in the air-pipe 70, to relieve the fuel-tank of air, if need be.

It is obvious that the above-described motor mechanism entire, including engine, furnace, boiler, air-pump, fuel-tank with injectors and atomizers, and their described connections may be employed as effectually for propelling boats as for road-vehicles.

Fig. 20 illustrates the main parts of the vehicle in side elevation, showing the usual treadle and chain attachment with the axle 2, and an air-pump cylinder, J, arranged at one end of the engine-cylinder and connected by an air-pipe, $f$, with the fuel-tank 13. The piston-rod of the engine is, as shown, continued through the rear head of the steam-cylinder and into the cylinder J, and there connected to an ordinary pump piston-head. By means of this arrangement the rider can, by running the vehicle a short distance by the treadles, give such motion to the engine-piston, and through that to said air-pump, as will in a few moments cause the injection of fuel into the furnace and enough steam to be generated to run the vehicle, thereby obviating the necessity of working an air-pump by hand, as aforesaid, and providing one which is operated directly by the driving-engine, which may, if desired, supersede the use of an independent air-pump for continuous operation of the machine on the road.

I do not in this application claim the mechanism for spraying and burning hydrocarbon fuel under a boiler when such apparatus is adapted for such boilers as are now in common use, as claims for such apparatus are embodied in my application No. 215,862, of October 11, 1886; neither do I claim herein the mechanism for supplying air-pressure to vapor-sprayers of general use, as such apparatus forms part of my application No. 217,670, filed November 1, 1886; neither do I claim features of the steering apparatus adapted to tricycles of ordinary construction as distinguished from steam road-vehicles.

What I claim as my invention is—

1. A steam-propelled road-vehicle consisting of a frame, substantially as described, an axle having suitable bearings in said frame and having thereon the main supporting and driving wheels, one or more steering and supporting wheels, substantially as described, attached to one end of said frame, a boiler-furnace and a boiler, substantially as described, attached to the latter, a steam-engine connected with said boiler and with said axle, a steam-actuated air-pump, also connected with said boiler, one or more water-tanks, a suitable feed-pump, substantially as described, connected with said tanks and with said boiler, a condenser, substantially as described, located in one or both of said tanks, connected with and receiving the exhaust-steam from the engine and from said air-pump, a liquid-fuel tank supported near said furnace and connected with said air-pump by a suitable pipe, and a series of fuel injectors and atomizers, substantially as described, attached to said fuel-tank and injecting liquid fuel through the walls of said furnace.

2. A steam-propelled road-vehicle consisting of a frame, substantially as described, an axle having suitable bearings in said frame and having thereon the main supporting and driving wheels, one or more steering and supporting wheels, substantially as described, attached to one end of said frame, a boiler-furnace and a boiler, substantially as described, attached to the latter, a steam-engine connected with said boiler and with said axle, a steam-actuated air-pump, also connected with said boiler, one or more water-tanks, a suitable feed-pump, substantially as described, connected with said tanks and with said boiler, a liquid-fuel tank supported near said furnace and connected with said air-pump by a suitable pipe, and a series of fuel injectors and atomizers, substantially as described, attached to said fuel-tank and injecting liquid fuel through the walls of said furnace.

3. In a steam-propelled road-vehicle, a boiler and a furnace, substantially as described, a steam-engine connected with said boiler and with the axle of the vehicle, a steam-actuated air-pump connected by a suitable steam-pipe with said boiler, a valve, 73, connected in said air-pump steam-pipe to automatically close the steam-passage in the latter, one or more water-tanks, a suitable feed-pump, substantially as described, connected with one or both of said tanks and with said boiler, a condenser, substantially as described, located in one or both of said tanks connected with and receiving the exhaust-steam from the engine and from said air-pump, a liquid-fuel tank supported near said furnace and connected with said air-pump by a suitable pipe, whereby air is forced into said fuel-tank, and a series of fuel injectors and atomizers, substantially as described, attached to said fuel-tank and injecting liquid fuel through the walls of said furnace.

4. In a steam road-vehicle, a boiler and a furnace, substantially as described, a steam-engine connected with said boiler and with the axle of the vehicle, an air-pump capable of being actuated by hand or by steam from said boiler, one or more water-tanks having therein one or more perforated diaphragms, 18, a suitable feed-pump, substantially as described, connected with one or both of said tanks and with said boiler, a liquid-fuel tank supported near said furnace, having therein one or more perforated diaphragms, 42, and connected with said air-pump by a suitable pipe, whereby air is forced into said fuel-tank, and a series of fuel injectors and atomizers, substantially as described, attached to said fuel-tank and injecting liquid fuel through the walls of said furnace.

5. In a steam road-vehicle, a boiler and a furnace, substantially as described, a steam-engine connected with said boiler and with the axle of the vehicle, an air-pump connected by a suitable steam-pipe with said boiler, a valve, 73, connected in said air-pump steam-pipe to automatically close and open the steam-passage in the latter, a liquid-fuel tank supported near said furnace and connected with said air-pump by a suitable pipe, whereby air is forced into said fuel-tank, a valve, substantially as described, connected in the pipe between the air-pump and fuel-tank and actuated by the air-pressure in said tank, having its end entering transversely the passage in the steam-pipe of the air-pump to restrict said passage, and a series of fuel injectors and atomizers, substantially as described, attached to said fuel-tank and injecting liquid fuel into said furnace.

6. A steam-propelled road-vehicle consisting of a frame, substantially as described, an axle having suitable bearings in said frame and having thereon the main supporting and driving wheels, one or more steering and supporting wheels, substantially as described, attached to one end of said frame, a boiler-furnace and a boiler, substantially as described, attached to the latter, a steam-engine connected with said boiler and with said axle, a steam-actuated air-pump, also connected with said boiler, one or more water-tanks, a suitable feed-pump, substantially as described, connected with said tanks and with said boiler, a liquid-fuel tank supported near said furnace and connected with said air-pump by a suitable pipe, a fuel-lighting lamp, substantially as described, supplying a flame within said furnace, and a series of fuel injectors and atomizers, substantially as described, attached to said fuel-tank and injecting liquid fuel through the walls of said furnace.

7. In combination, a furnace, substantially as described, the boiler 26, consisting of the hollow head 27 and a series of tubes connected by one end to said head, the furnace 11, inclosing said boiler, the liquid-fuel tank 13, located under the latter, having a series of injector and atomizing tubes connected therewith to inject the liquid fuel into said furnace, the bed 30, interposed between the boiler and the fuel-tank, a road-vehicle, substantially as described, a steam-engine attached to said boiler and connected with the axle of said vehicle, an air-pump to force air into said fuel-tank, suitable water-tanks, and a feed-pump to force water from the latter into said boiler.

JAMES H. BULLARD.

Witnesses:
H. A. CHAPIN,
H. F. ASHTON.